(12) United States Patent
Lai (10) Patent No.: US 9,594,992 B1
(45) Date of Patent: Mar. 14, 2017

(54) IDENTIFIABLE TICKET AND MONITORING SYSTEM THEREFOR

(71) Applicant: Chung-Ping Lai, Zhubei (TW)

(72) Inventor: Chung-Ping Lai, Zhubei (TW)

( * ) Notice: Subject to any disclaimer, the term of this patent is extended or adjusted under 35 U.S.C. 154(b) by 0 days.

(21) Appl. No.: 15/016,262

(22) Filed: Feb. 5, 2016

(51) Int. Cl.
*G06K 21/00* (2006.01)
*G06K 19/02* (2006.01)
*G06K 7/10* (2006.01)

(52) U.S. Cl.
CPC ....... *G06K 19/025* (2013.01); *G06K 7/10297* (2013.01); *G06K 7/10316* (2013.01)

(58) Field of Classification Search
CPC ......... G06K 19/07749; G06K 19/0723; G06K 19/07798; G06K 19/07745; G06K 19/073; G06K 19/07345; G06K 19/07758; G06K 19/0776; G06K 17/0025; G06K 19/0775; G06K 7/0008; G06K 7/087; G06K 19/0739; G06K 19/07718; G06K 19/07756
USPC ....................................... 235/492
See application file for complete search history.

(56) References Cited

U.S. PATENT DOCUMENTS

| 2007/0158412 A1* | 7/2007 | Kang | G06K 17/0025 235/380 |
| 2011/0102279 A1* | 5/2011 | Immonen | G06K 7/10178 343/720 |

\* cited by examiner

*Primary Examiner* — Seung Lee (57) ABSTRACT

An identifiable ticket contains: a body and a radio frequency identification (RFID) tag attached on the body. The RFID tag includes a chip and an antenna, the chip stores an identified message, and the antenna is electrically connected with the chip. The body includes a ticket stub and at least one separable part removable from the ticket stub so as to tear off the antenna, hence the RFID tag responds reading operations of at least one tag reader in different frequency bands and distances after the antenna is torn off or based on a length of the antenna. A monitoring system for the identifiable ticket contains the identifiable ticket, a computer, and the at least one tag reader. The at least one tag reader is connected with the computer and reads the RFID tag so as to acquire and to send the identified message to the computer.

10 Claims, 9 Drawing Sheets

IDENTIFIABLE TICKET AND MONITORING SYSTEM THEREFOR

FIELD OF THE INVENTION

The present invention relates to an identifiable ticket and a monitoring system therefor which monitors, identifies, tracks and records ticket owners in any restricted areas.

BACKGROUND OF THE INVENTION

A conventional ticket is made of paper so that its owner is accessible to a restricted area, such as a concert site or amusement park using the ticket. However, this conventional ticket cannot be used repeatedly.

To overcome above-mentioned problem, an identifiable ticket has been developed and contains a magnetic stripe card and a radio frequency identification (RFID) tag, wherein the magnetic stripe card stores and stores message in a touching manner, and the RFID tag stores the message in untouching manner, so the magnetic stripe card and the RFID tag cannot used in the same manner. The present invention has arisen to mitigate and/or obviate the afore-described disadvantages.

SUMMARY OF THE INVENTION

The primary objective of the present invention is to provide an identifiable ticket and a monitoring system therefor which monitors, identifies, tracks and records ticket owners in any restricted areas.

To obtain above-mentioned objective, an identifiable ticket and a monitoring system therefor provided by the present invention, wherein the identifiable ticket includes a body and a radio frequency identification (RFID) tag attached on the body, the RFID tag including a chip and an antenna, wherein the chip stores an identified message, and the antenna is electrically connected with the chip, the body includes a ticket stub and at least one separable part removable from the ticket stub so as to tear off the antenna, such that the RFID tag responds reading operations of at least one tag reader in different frequency bands and distances after the antenna is torn off or based on a length of the antenna which is torn off.

The monitoring system contains a computer; and the at least one tag reader, wherein the at least one tag reader is in connection with the computer and reads the RFID tag of the body so as to acquire and to send the identified message to the computer.

DETAILED DESCRIPTION OF THE PREFERRED EMBODIMENTS

Figure 1:
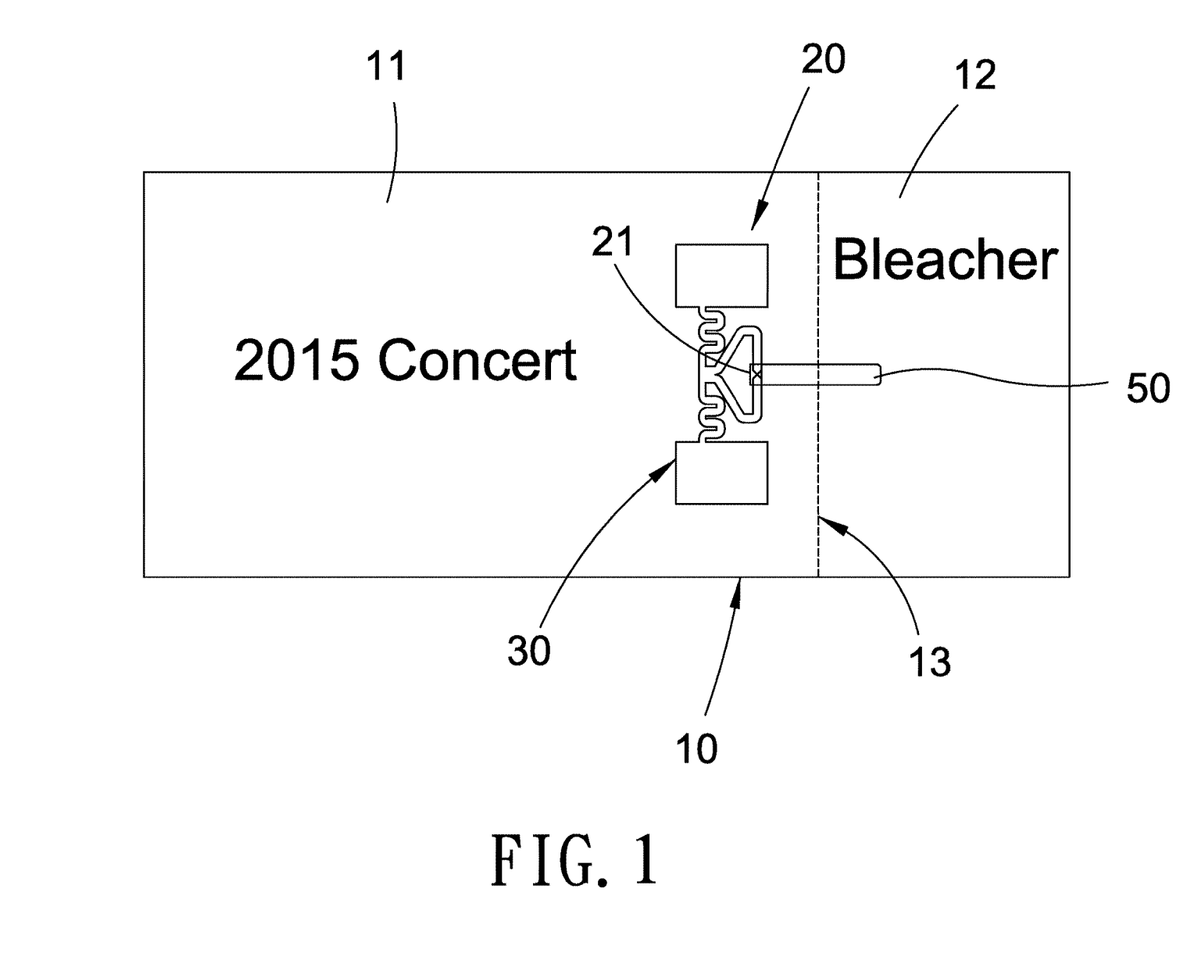
FIG. 1 is a schematic view showing the assembly of an identifiable ticket according to a preferred embodiment of the present invention.

With reference to FIG. 1, an identifiable ticket according to a preferred embodiment of the present invention comprises: a body 10 and a radio frequency identification (RFID) tag 20 attached on the body 10, wherein the RFID tag 20 includes a chip 21 and an antenna 30, the chip 21 stores an identified message, and the antenna 30 is electrically connected with the chip 21. The body 10 includes a ticket stub 11 and a separable part 12 removable from the ticket stub 11 so as to tear off the antenna 30, such that the RFID tag 20 responds reading operations of plural tag readers in different frequency bands and distances after the antenna 30 is torn off or based on a length of the antenna 30 which is torn off.

Figure 2:
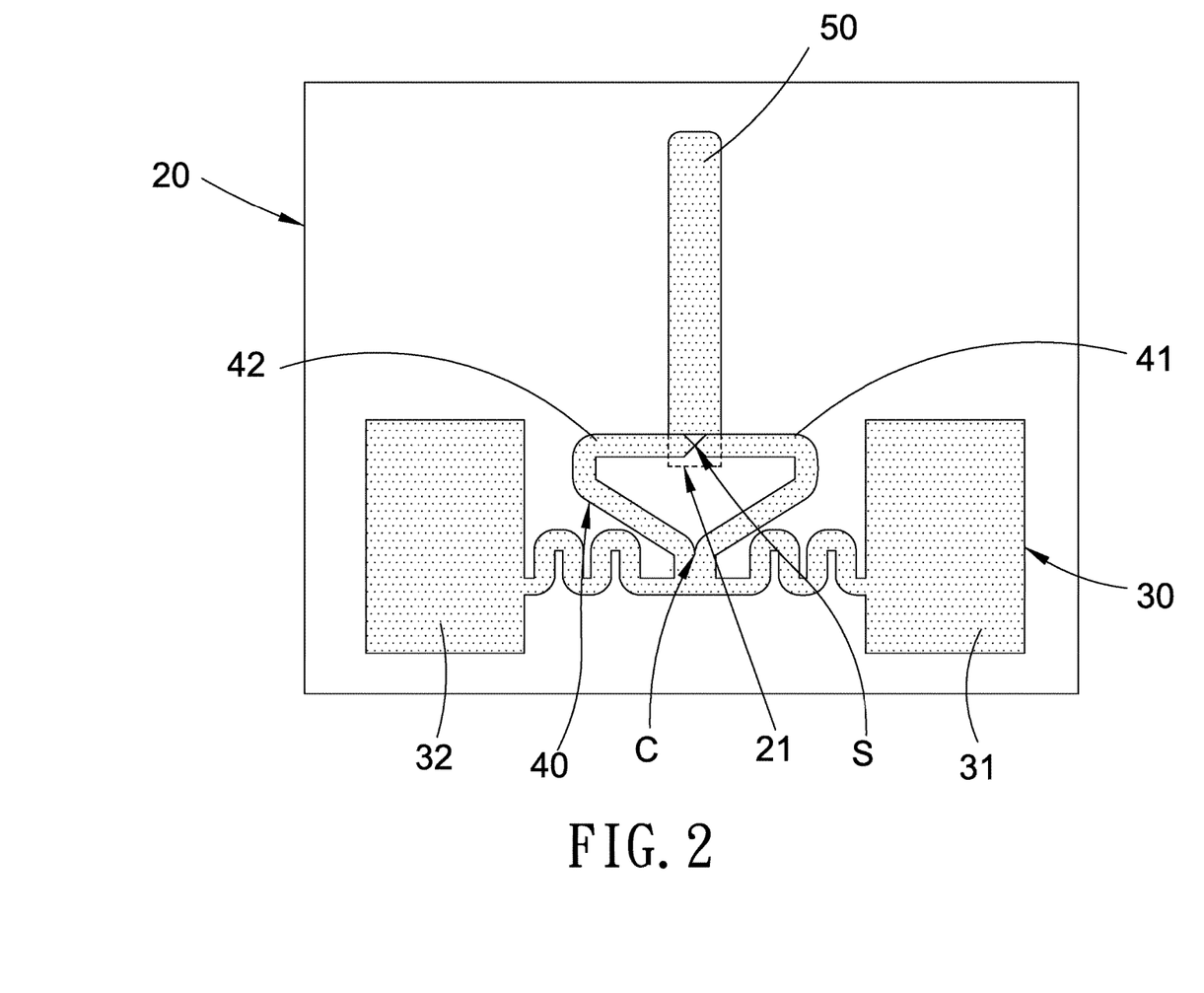
FIG. 2 is a schematic view showing the assembly of a RFID tag of the identifiable ticket according to the preferred embodiment of the present invention.

Referring to FIG. 2, the antenna 30 of the RFID tag 20 has a short-circuit loop 40, an impedance adjusting portion 50, and a first radiator 31 and a second radiator 32 which are symmetrical to each other along a central point C. The short-circuit loop 40 has a first loop section 41 and a second loop section 42, wherein a front end of the first loop section 41 is electrically connected with the first radiator 31, and a front end of the second loop section 42 is electrically coupled with a second radiator 32, and a distal end of each of the first loop section 41 and the second loop section 42 has a contact point S which connects with the chip 21. The impedance adjusting portion 50 conducts electricity and is electrically connected on the short-circuit loop 40, when the impedance adjusting portion 50 is not torn off, the RFID tag 20 responds a reading operation of a first tag reader in a first frequency band; and when the separable part 12 is removable from the ticket stub 11, the impedance adjusting portion 50 is torn off and its length is changed, and the RFID tag 20 responds a reading operation of a second tag reader in a second frequency band.

In one embodiment, the RFID tag 20 is an active tag or a passive tag, the body 10 is made of paper, and the antenna 30 is a printed antenna or a metal antenna. In one embodiment, the antenna 30 is made of conductive ink with graphene and is printed on the body 10 in a screen printing manner, such that the antenna 30 is torn off easily as the separable part 12 is removable from the ticket stub 11. Furthermore, the antenna 30 is adhered on one side surface of the body 10 in any one of etching, plating, and metal foil adhering manners. In one embodiment, the antenna 30 has a part of a tear-off line 13 so as to be torn off along the part of the tear-off line 13.

Figure 3A:
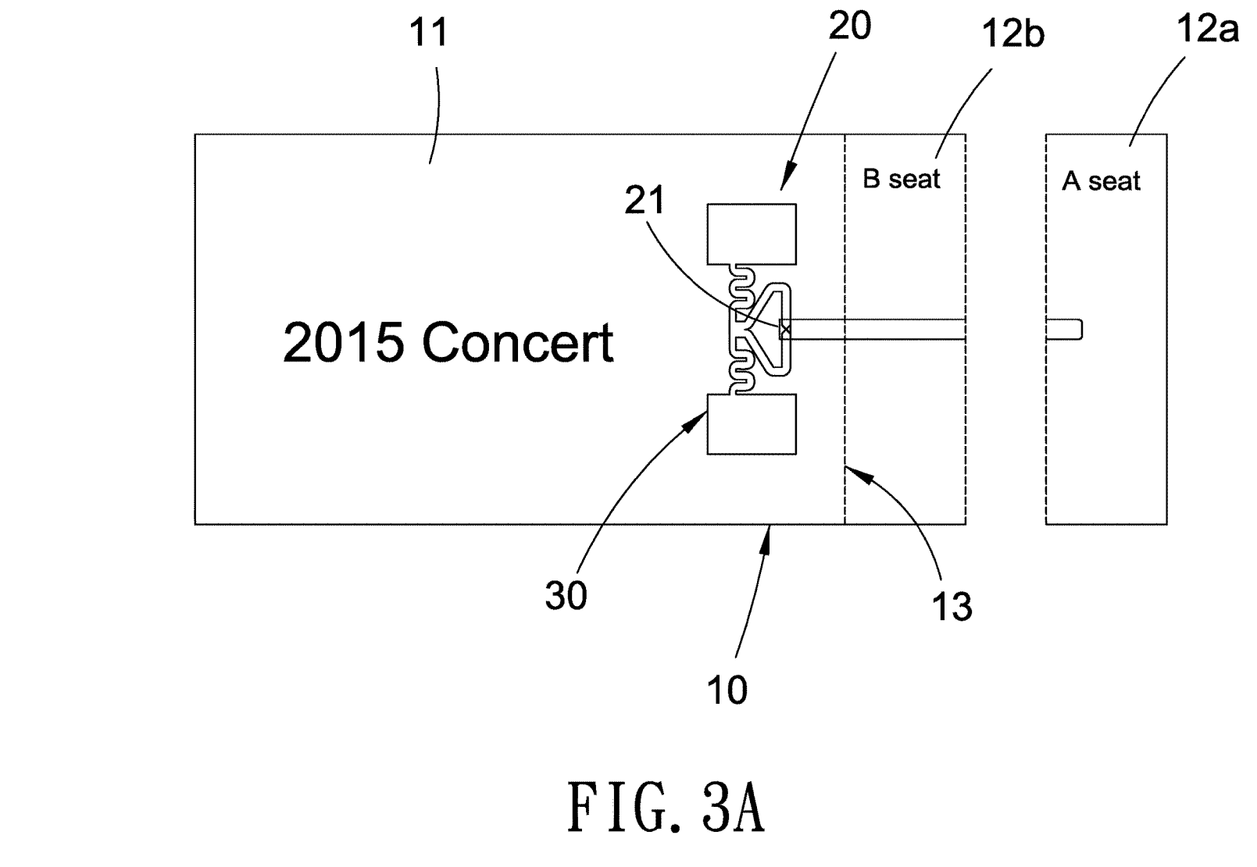
FIG. 3A is a schematic view showing the operation of the identifiable ticket according to the preferred embodiment of the present invention.
Figure 4:
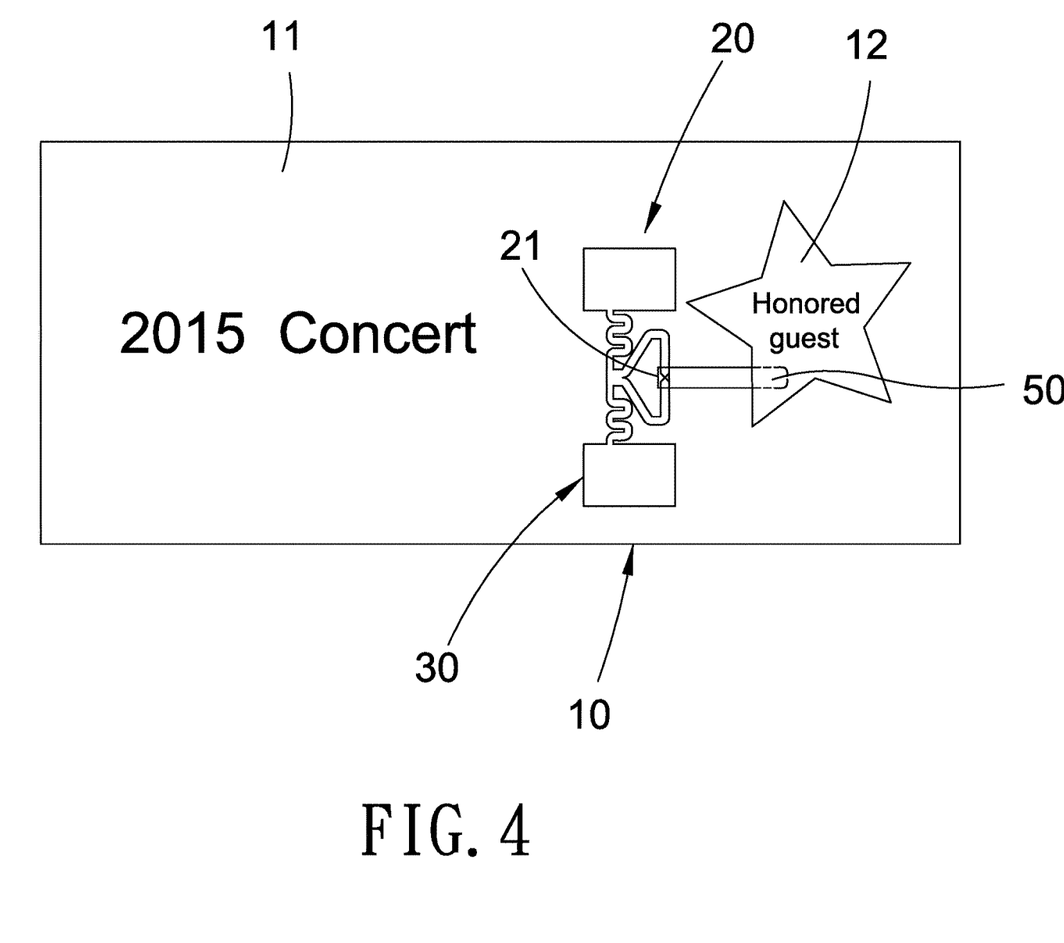
FIG. 4 is a schematic view showing the assembly of an identifiable ticket according to another preferred embodiment of the present invention.

As shown in FIG. 1, the body 10 includes the tear-off line 13 so as to separate the separable part 12 from the ticket stub 11 along the tear-off line 13. In another embodiment, as illustrated in FIG. 3A, the body 10 includes two tear-off lines 13, and a part of the antenna 30 of the RFID tag 20 intersects with the two tear-off lines 13, so when two separable parts 12 are separated from the ticket stub 11 along the two tear-off lines 13 respectively, the part of the antenna 30 is torn off. With reference to FIG. 4, in another embodiment, the separable part 12 is adhered on and is removed from the ticket stub 11. In other words, the separable part 12 is a sticker adhered on the ticket stub 11 and is formed in a specific shape or patterns based on usage of the identifiable ticket.

Figure 5:
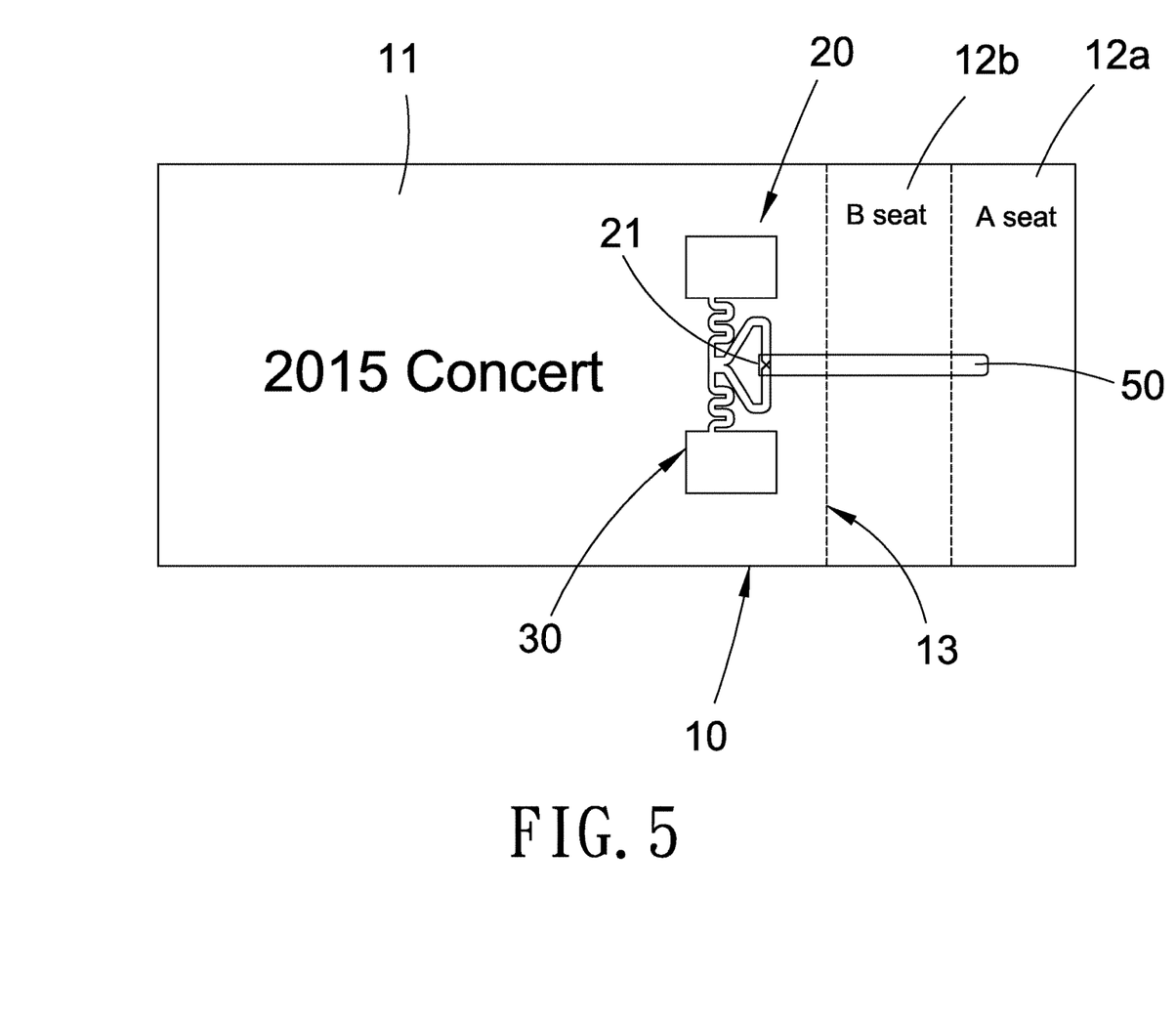
FIG. 5 is a schematic view showing the assembly of an identifiable ticket according to another preferred embodiment of the present invention.

Referring to FIG. 1, the body 10 includes one separable part 12. In another embodiment, the body 10 includes at least two separable parts 12 which are separable from the ticket stub 11, as shown in FIG. 5. For example, the body 10 includes two separable parts 12 (i.e., a first separable part 12a and a second separable part 12b) which are separable from the ticket stub 11 so as to tear off the part of the antenna 30. Preferably, the RFID tag 20 responds the reading operations of the plural tag readers in different frequency bands and distances after the antenna 30 is torn off or based on the length of the antenna 30 which is torn off.

Figure 6:
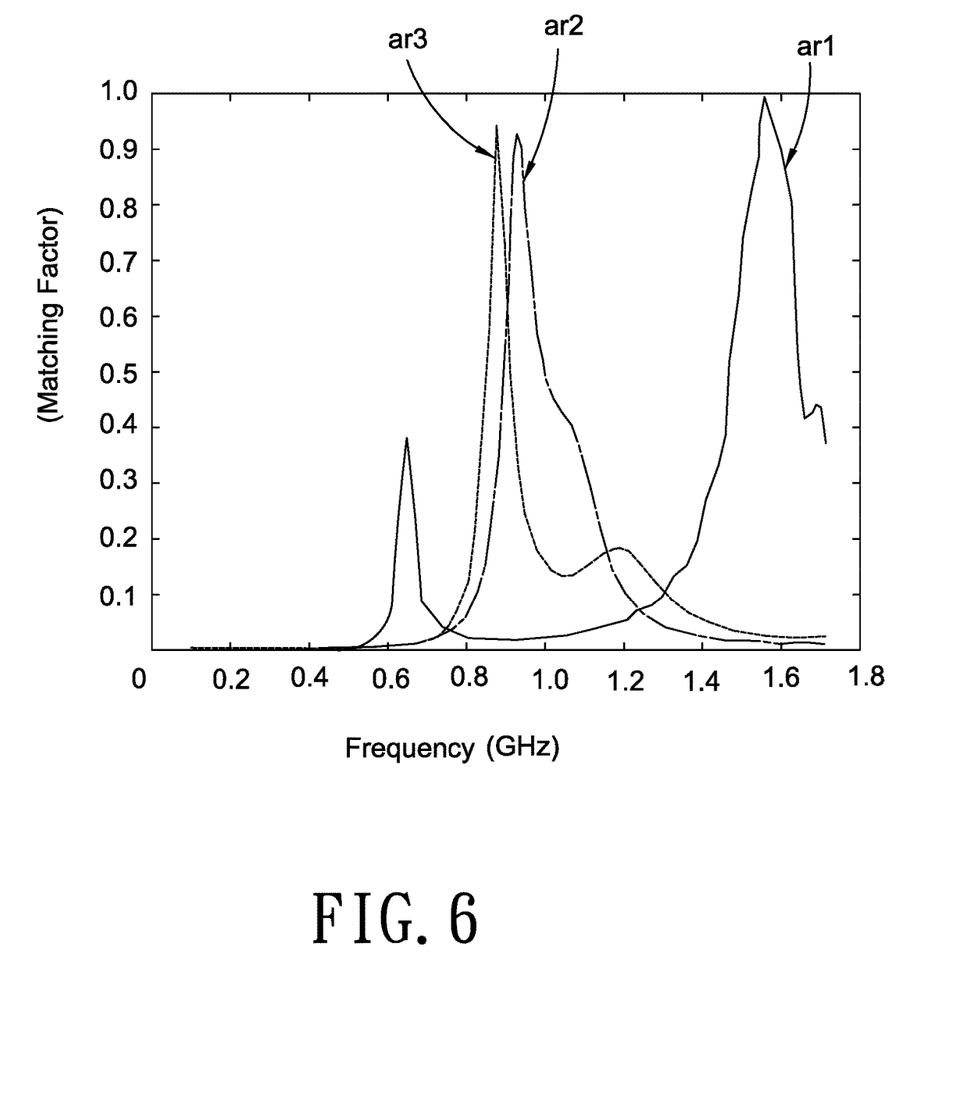
FIG. 6 is a schematic view showing matching factor against frequency of the identifiable ticket according to the preferred embodiment of the present invention.

Referring to FIG. 6, a right solid curve is denoted as a first curve ar1, a middle dotted curve is indicated as a second curve ar2, and a left dotted curve is represented as a third curve ar3.

In one embodiment, when the antenna 30 of the RFID tag 20 is not torn off, it responds the reading operation of the first tag reader in the first frequency band, and frequency response of the RFID tag 20 is weak and a reading distance of the RFID tag 20 is short. Accordingly, when the antenna 30 of the RFID tag 20 is not torn off, the identifiable ticket is an admission ticket accessible to a restricted area. The reading operation of each of the first and second tag readers includes transmitting and receiving radio signal between the tag reader and the RFID tag 20, and frequency arrangement of the first frequency band is indicated by the first curve ar1 of FIG. 6.

Referring to FIG. 3A, when the first separable part 12a is removed from the ticket stub 11, the impedance adjusting portion 50 is torn off, and a length of a remained portion 51 of the impedance adjusting portion 50 is changed. In addition, the RFID tag 20 responds the reading operation of the second tag reader in the second frequency band, wherein the frequency arrangement of the second frequency band is denoted by the second curve ar2 of FIG. 6, and frequency response of the RFID tag 20 is strong and the reading distance of the RFID tag 20 is long, so after ticket owner holds the identifiable ticket and enters into the restricted area from an entrance, the second tag reader in the second frequency band reads the RFID tag 20.

Figure 3B:
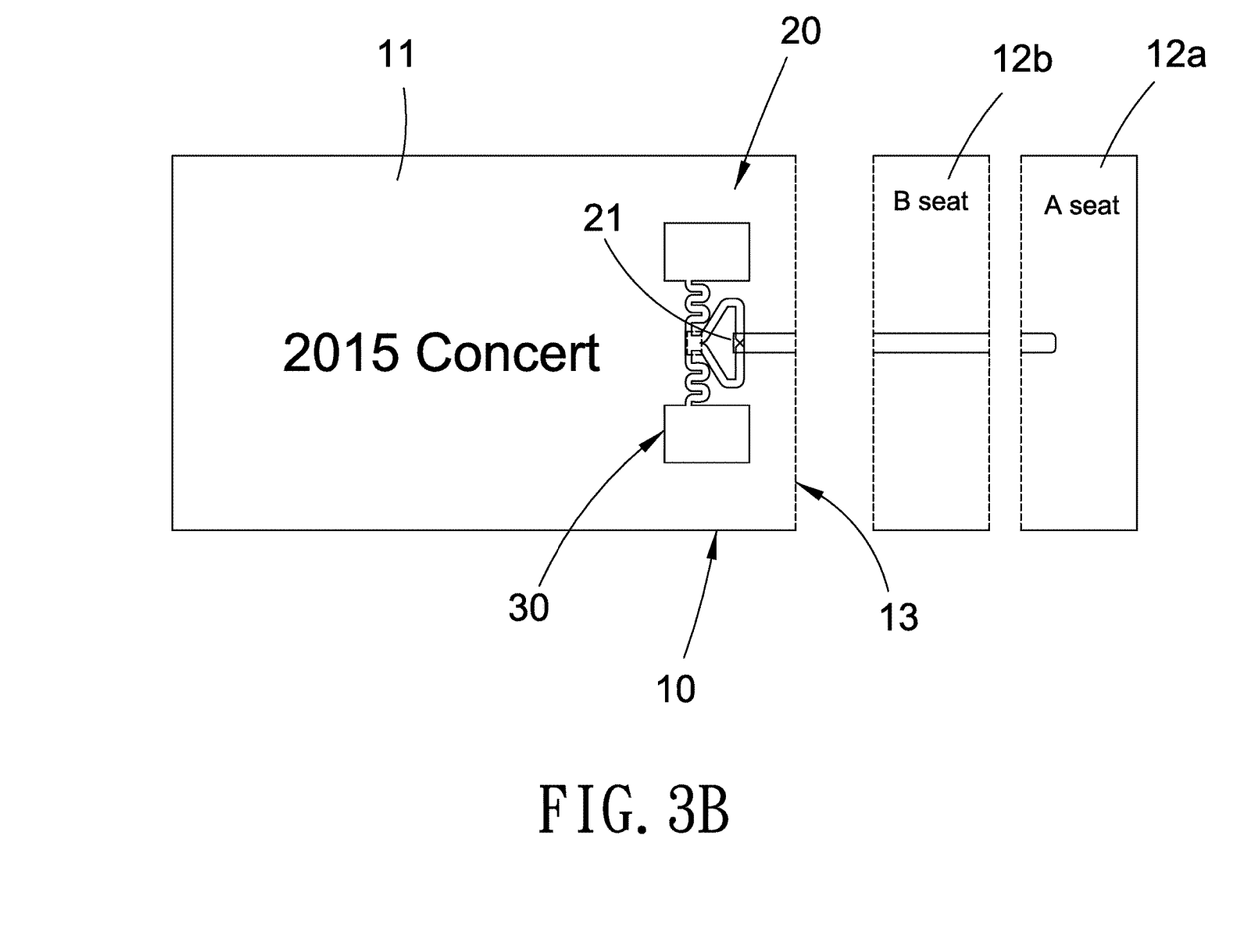
FIG. 3B is another schematic view showing the operation of the identifiable ticket according to the preferred embodiment of the present invention.

With reference to FIG. 3B, when the second separable part 12b is separated from the ticket stub 11, the RFID tag 20 responds a third tag reader in a third frequency band, and frequency arrangement of the third frequency band is represented by the third curve ar3. Therefore, the body 10, which includes the two separable parts 12 (i.e., a first separable part 12a and a second separable part 12b), is used in different restricted areas (such as viewing areas in a concert which are made level by ticket prices). For instance, the ticket owner enters a designated area according to the separable part 12. When the ticket owner enters an undesignated area, the tag reader scans and senses the ticket owner enters the undesignated are.

Figure 7:
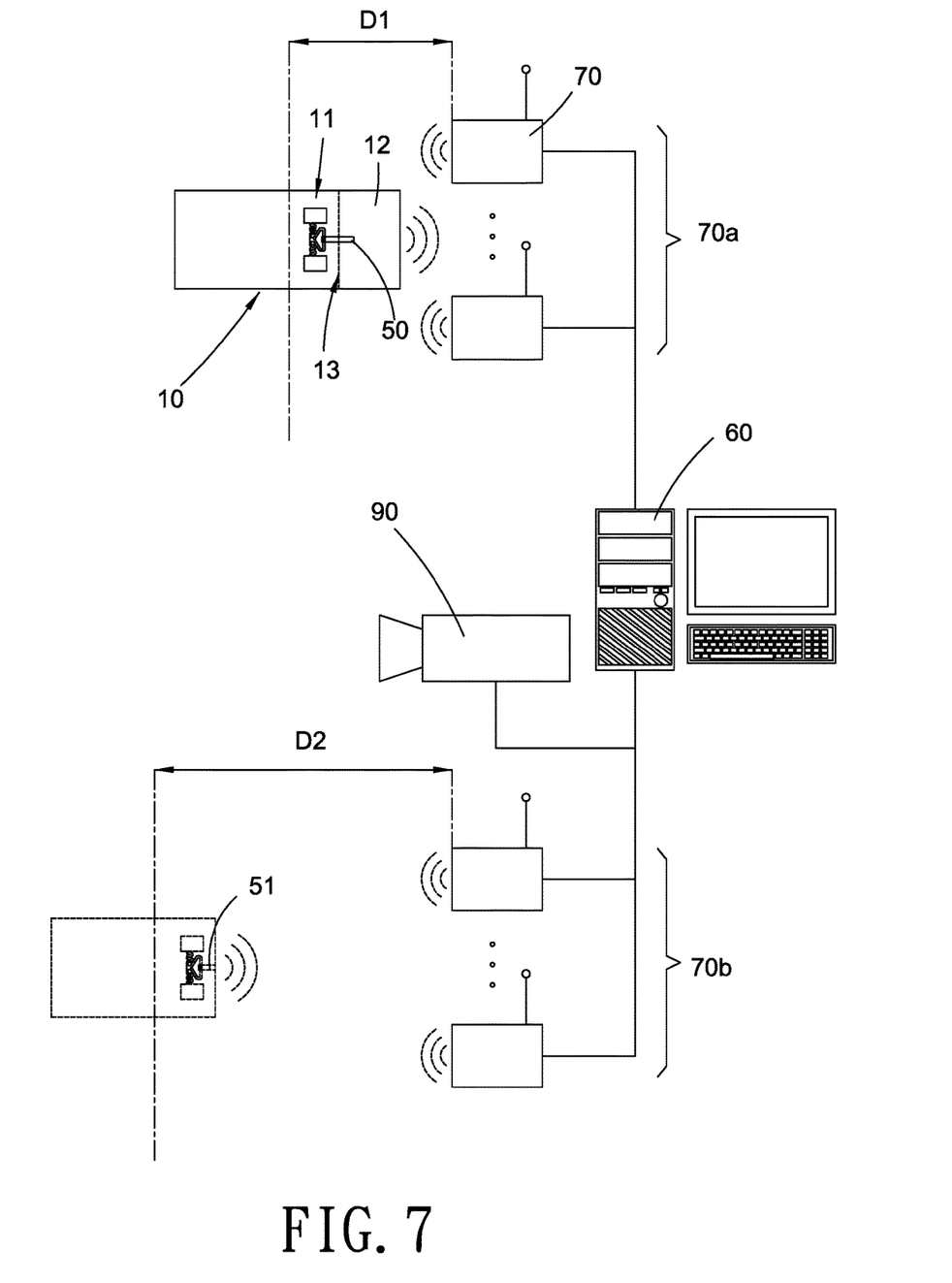
FIG. 7 is a schematic view showing the assembly of a monitoring system for the identifiable ticket according to the preferred embodiment of the present invention.

With reference to FIG. 7, a monitoring system for the identifiable ticket according to a preferred embodiment of the present invention comprises: the identifiable ticket, a computer 60, and at least one tag reader 70, wherein the at least one tag reader 70 is in connection with the computer 60 and reads the RFID tag 20 of the body 10 so as to acquire and send the identified message to the computer 60. The monitoring system comprises at least two tag readers (such as a first tag reader 70a and a second tag reader 70b), and the first tag reader 70a reads the RFID tag 20 in a first reading distance D1, the second tag reader 70b reads the RFID tag 20 in a second reading distance D2. Preferably, a number of the at least two tag readers is changeable based on using requirements. In one embodiment, the first tag reader 70a reads the RFID tag 20 in a short distance, such as less than 1M, hence the first tag reader 70a is fixed at the entrance of the restricted area. In another embodiment, the second tag reader 70b reads the RFID tag 20 in a long distance such as within 1M to 10M, hence the second tag reader 70b is in the restricted area so as to scan the body 10.

Furthermore, the monitoring system further comprises an image recording device 90 (such as a digital camera) fixed at a predetermined position of the restricted area and connected with the computer 60 so as to send camera images to the computer 60.

Figure 8:
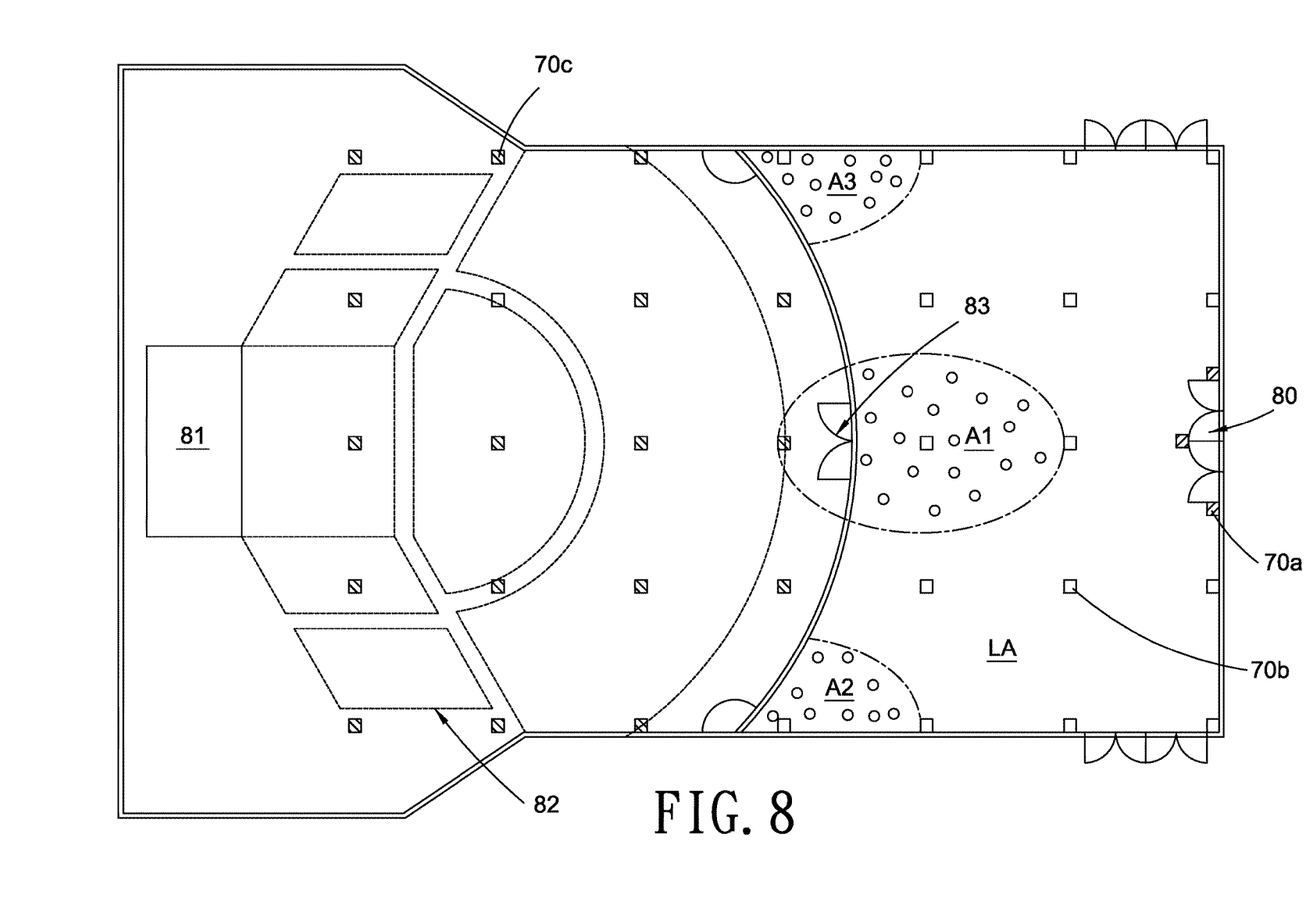
FIG. 8 is a schematic view showing the application of the monitoring system for the identifiable ticket according to the preferred embodiment of the present invention.

In another embodiment, the monitoring system further comprises a plurality of tag readers 70 with various frequency bands and reading distances according to using requirements. For instance, as shown in FIG. 8, the plurality of tag readers 70 are arranged at predetermined positions in the restricted area respectively, and each tag reader 70 has an identification code and is connected with the computer 60 in a wired or wireless (such as WiFi) manner. Said each tag reader 70 reads the identifiable ticket, acquires identified message and sends the identification code to the computer 60 so as to monitor, identify, track and record the ticket owner in the restricted area.

As illustrated in FIG. 8, plural first tag readers 70a are mounted in the restricted area (such as the entrance 80 in a concert site) so as to read the RFID tag 20 of the identifiable ticket in the first frequency band. In addition, the concert site contains a plurality of viewing areas 82 arranged around a stage 81 based on ticket's prices and plural entrances 83 to the plurality of viewing arrears 82, respectively. A plurality of second tag readers 70b are arranged in a lobby LA between each entrance 80 and each viewing area 83 so as to read the RFID tag 20 of the identifiable ticket in the second frequency band. Preferably, plural third tag readers 70c are configured in the plurality of viewing areas 82, respectively, so as to read the RFID tag 20 of the identifiable ticket in the third frequency band.

The RFID tag 20 of the identifiable ticket responds the plurality of tag readers 70 (such as the first, second, and third tag readers 70a, 70b, and 70c) in different frequency bands and distances by using the separable part 12 of the body 10 so as to acquire the identified message and to send the identification code to the computer 60. Thereafter, the computer 60 analyzes the identified message and the identification code so as to monitor, identify, track and record the ticket owner in the restricted area. For example, the monitoring system senses crowded ticket owners gather in gathering zones A1, A2, A3 of the lobby LA so as to evacuate the crowded ticket owners.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An identifiable ticket comprising:
a body and a radio frequency identification (RFID) tag attached on the body;
the RFID tag including a chip and an antenna, wherein the chip stores an identified message, and the antenna is electrically connected with the chip, the body includes a ticket stub and at least one separable part removable from the ticket stub so as to tear off the antenna, such that the RFID tag responds reading operations of plural tag readers in different frequency bands and distances after the antenna is torn off or based on a length of the antenna which is torn off;
wherein the antenna of the RFID tag has a short-circuit loop, an impedance adjusting portion, and a first radiator and a second radiator which are symmetrical to each other along a central point; the short-circuit loop has a first loop section and a second loop section, wherein a front end of the first loop section is electrically connected with the first radiator, a front end of the second loop section is electrically coupled with a second radiator, and a distal end of each of the first loop section and the second loop section has a contact point which connects with the chip; the impedance adjusting portion conducts electricity and is electrically connected on the short-circuit loop, when the impedance adjusting portion is not torn off, the RFID tag responds a reading operation of a first tag reader in a first frequency band, and when the at least one separable part is removable from the ticket stub, the impedance adjusting portion is torn off and its length is changed, and the RFID tag responds a reading operation of a second tag reader in a second frequency band.

2. The identifiable ticket as claimed in claim 1, wherein the body includes at least one tear-off line so as to separate the at least one separable part from the ticket stub along the at least one tear-off line respectively, wherein a part of the antenna of the RFID tag intersects with the at least one tear-off line, so when the at least one separable part is separated from the ticket stub along the at least one tear-off line, the part of the antenna is torn off.

3. The identifiable ticket as claimed in claim 1, wherein the at least one separable part is adhered on and is removed from the ticket stub.

4. The identifiable ticket as claimed in claim 1, wherein the body is made of paper, and the antenna is a printed antenna or a metal antenna.

5. The identifiable ticket as claimed in claim 4, wherein the antenna has a part of a tear-off line so as to be torn off along the part of the tear-off line.

6. The identifiable ticket as claimed in claim 1, wherein the antenna of the RFID tag is made of conductive ink with graphene and is printed on the body.

7. The identifiable ticket as claimed in claim 1, wherein the RFID tag is an active tag or a passive tag.

8. A monitoring system for an identifiable ticket comprising:
an identifiable ticket including a body and a radio frequency identification (RFID) tag attached on the body, the RFID tag including a chip and an antenna, wherein the chip stores an identified message, and the antenna is electrically connected with the chip, the body includes a ticket stub and at least one separable part removable from the ticket stub so as to tear off the antenna, such that the RFID tag responds reading operations of at least one tag reader in different frequency bands and distances after the antenna is torn off or based on a length of the antenna which is torn off;
a computer; and
the at least one tag reader, wherein the at least one tag reader is in connection with the computer and reads the RFID tag of the body so as to acquire and to send the identified message to the computer;
wherein the at least one tag reader is configured to read the RFID tag in different frequency bands respectively, wherein the body includes at least two separable parts separable from the ticket stub, and before and after any one of the at least two separable parts is separated from the ticket stub, the RFID tag responds one of the at least one tag reader in a corresponding frequency band;
wherein the at least one tag reader is arranged at predetermined positions in a restricted area respectively, and each tag reader has an identification code and reads the identifiable ticket, acquires identified message and sends the identification code to the computer.

9. The monitoring system as claimed in claim 8, wherein the antenna of the RFID tag has a short-circuit loop, an impedance adjusting portion, and a first radiator and a second radiator which are symmetrical to each other along a central point; the short-circuit loop has a first loop section and a second loop section, wherein a front end of the first loop section is electrically connected with the first radiator, a front end of the second loop section is electrically coupled with a second radiator, and a distal end of each of the first loop section and the second loop section has a contact point which connects with the chip; the impedance adjusting portion conducts electricity and is electrically connected on the short-circuit loop, when the impedance adjusting portion is not torn off, the RFID tag responds a reading operation of a first tag reader in a first frequency band, and when the at least one separable part is removable from the ticket stub, the impedance adjusting portion is torn off and its length is changed, and the RFID tag responds a reading operation of a second tag reader in a second frequency band.

10. The monitoring system as claimed in claim 8 further comprising an image recording device fixed at a predetermined position of the restricted area and connected with the computer so as to send camera images to the computer.

* * * * *